US 11,879,810 B2

(12) United States Patent
Cintas et al.

(10) Patent No.: US 11,879,810 B2
(45) Date of Patent: Jan. 23, 2024

(54) PREDICTING TIRE IMBALANCE AND/OR WHEEL MISALIGNMENT

(71) Applicant: International Business Machines Corporation, Armonk, NY (US)

(72) Inventors: Celia Cintas, Nairobi (KE); Michael S. Gordon, Yorktown Heights, NY (US); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 17/021,358

(22) Filed: Sep. 15, 2020

(65) Prior Publication Data

US 2022/0082474 A1 Mar. 17, 2022

(51) Int. Cl.
*G01M 17/02* (2006.01)
*G01P 7/00* (2006.01)
(Continued)

(52) U.S. Cl.
CPC ............. *G01M 17/02* (2013.01); *B60C 19/00* (2013.01); *B60Q 9/00* (2013.01); *G01H 17/00* (2013.01);
(Continued)

(58) Field of Classification Search
CPC ........ G01M 17/02; G01M 1/225; G01M 1/28; B60C 19/00; B60C 2019/004; B60Q 9/00;
(Continued)

(56) References Cited

U.S. PATENT DOCUMENTS

| 7,813,851 B2 | 10/2010 | DeMersseman et al. |
| 7,912,683 B2 | 3/2011 | Miyashita et al. |

(Continued)

FOREIGN PATENT DOCUMENTS

| CN | 2935109 Y | 8/2007 |
| CN | 102072797 | 12/2012 |

(Continued)

OTHER PUBLICATIONS

Anonymous, System to Improve Tire Health Analysis, IP.Com, IPCOM000244340D, Dec. 3, 2015, 7 pages.
(Continued)

*Primary Examiner* — Michael V Kerrigan
(74) *Attorney, Agent, or Firm* — Shimon Benjamin; Otterstedt & Kammer PLLC

(57) ABSTRACT

An exemplary method includes vehicle-mounted sensors continuously detecting vehicle speed and vehicle tire and steering vibrations; a processor implementing a machine-learning program that continuously monitors signals from the vehicle-mounted sensors and compares detected vehicle tire and steering vibrations to upper bounds corresponding to detected vehicle speed; and the processor alerting a vehicle driver that wheel or tire service is required based on the detected vehicle tire and steering vibrations exceeding the upper bounds. An exemplary apparatus includes a vehicle; tires mounted to the vehicle; a speed sensor mounted to the vehicle; a vibration sensor mounted to the vehicle; and a processor connected in communication with the speed sensor and the vibration sensor. The processor is adapted to implement any of the method steps above.

20 Claims, 8 Drawing Sheets

(51) Int. Cl.
- *G01P 3/38* (2006.01)
- *G01P 15/00* (2006.01)
- *B60C 19/00* (2006.01)
- *B60Q 9/00* (2006.01)
- *G06Q 10/1093* (2023.01)
- *G06N 20/00* (2019.01)
- *G01H 17/00* (2006.01)

(52) U.S. Cl.
CPC ............... *G01P 3/38* (2013.01); *G01P 7/00* (2013.01); *G01P 15/00* (2013.01); *G06N 20/00* (2019.01); *G06Q 10/1095* (2013.01); *B60C 2019/004* (2013.01)

(58) Field of Classification Search
CPC ... G01H 17/00; G01P 3/38; G01P 7/00; G01P 15/00; G06N 20/00; G06N 3/08; G06Q 10/1095
See application file for complete search history.

(56) References Cited

U.S. PATENT DOCUMENTS

| | | |
|---|---|---|
| 10,391,822 B2 | 8/2019 | Hung |
| 2018/0003593 A1 | 1/2018 | Siegel et al. |
| 2020/0033220 A1* | 1/2020 | Raad .................. G01M 17/013 |
| 2021/0291597 A1* | 9/2021 | Suzuki .................. B60C 11/243 |

FOREIGN PATENT DOCUMENTS

| | | |
|---|---|---|
| CN | 104981685 B | 10/2015 |
| CN | 106274305 A | 1/2017 |
| EP | 1499508 B1 | 1/2005 |
| JP | 2002215727 A | 8/2002 |
| JP | 2003182476 A | 7/2003 |

OTHER PUBLICATIONS

Craighead, Sensing tyre pressure, damper condition and wheel balance from vibration measurements. Proceedings of the Institution of Mechanical Engineers, Part D: Journal of Automobile Engineering, 211(4), 1997, pp. 257-265.

* cited by examiner

PREDICTING TIRE IMBALANCE AND/OR WHEEL MISALIGNMENT

BACKGROUND

The present invention relates to the electrical, electronic, and computer arts, and more specifically, to automotive applications of artificial intelligence.

New tires on passenger vehicles often last a long time (2-3 years, 50,000+ miles). This is primarily due the fact that the wheels are in near perfect balance and alignment when the cars are new. As the vehicles age, the suspension typically becomes looser and the balance and alignment may change due to a number of factors (vehicle factors, road factors, and other contextual factors). Tire shops and mechanics recommend balancing the tires and aligning the vehicle when the tires are changed, and rotating the tires periodically, to prolong the life of the tires. Visually inspecting the tires can indicate uneven wear due to over/under inflation, poor vehicle wheel alignment, tire imbalance, and other effects of normal mileage, etc.

For the general public, however, it is not so easy to understand issues/symptoms related to tire imbalance and/or wheel misalignment. Tire imbalance and/or wheel misalignment may cause poor fuel economy, safety issues on the road, driving/riding discomfort, and long-term vehicle damage.

It should be noted that "alignment" is typically a "wheel alignment" so that the wheels point in the correct direction, while "balance" of the wheels/tires is corrected by adding weights to the wheel rim and can be performed statically by essentially using a bubble level or dynamically by spinning the wheel/tire and minimizing vibrations.

SUMMARY

Principles of the invention provide techniques for predicting tire imbalance. In one aspect, an exemplary method includes vehicle-mounted sensors continuously detecting vehicle speed and vehicle tire and steering vibrations; a processor implementing a machine-learning program that continuously monitors signals from the vehicle-mounted sensors and compares detected vehicle tire and steering vibrations to upper bounds corresponding to detected vehicle speed; and the processor alerting a vehicle driver that wheel or tire service is required based on the detected vehicle tire and steering vibrations exceeding the upper bounds.

According to another aspect, an exemplary apparatus includes a vehicle; tires mounted to the vehicle; a speed sensor mounted to the vehicle; a vibration sensor mounted to the vehicle; and a processor connected in communication with the speed sensor and the vibration sensor. The processor is adapted to implement any of the method steps above.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Prompt prediction of tire imbalance in response to detection of abnormal vibration.

Prompt prediction of tire imbalance in response to detection of abnormal tire tread imagery.

Prediction of a driver/passenger discomfort score in response to predicted tire imbalance.

Predicting of a pattern of vehicle drifting in response to detection of tire imbalance and/or misalignment.

Scheduling of maintenance before a time when a driver/passenger discomfort score is predicted to exceed a threshold value.

Estimating potential causality event in anticipated directions of road/travel due to the predicted pattern of drifting, analysis of road condition and roadside events.

These and other features and advantages of the present invention will become apparent from the following detailed description of illustrative embodiments thereof, which is to be read in connection with the accompanying drawings.

DETAILED DESCRIPTION

Figure 1:
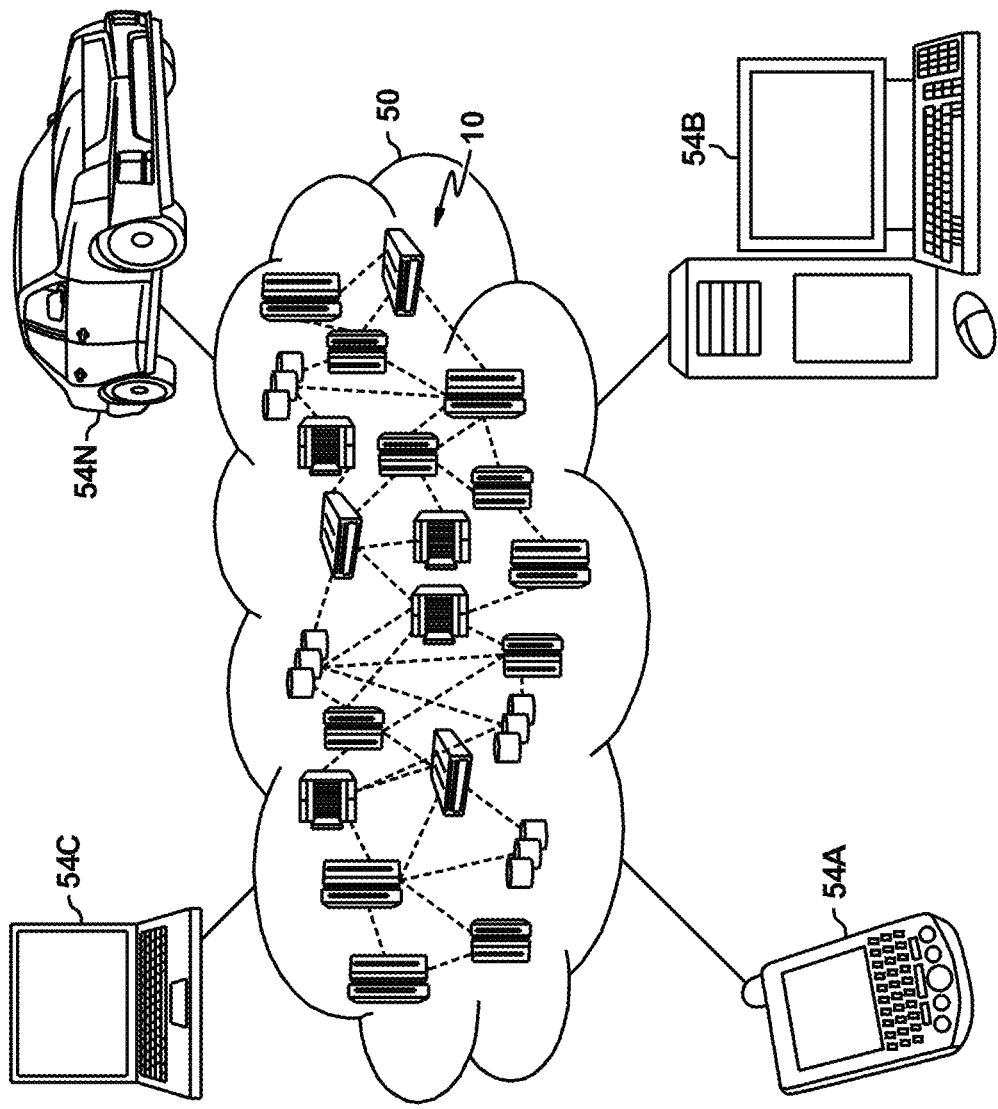
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
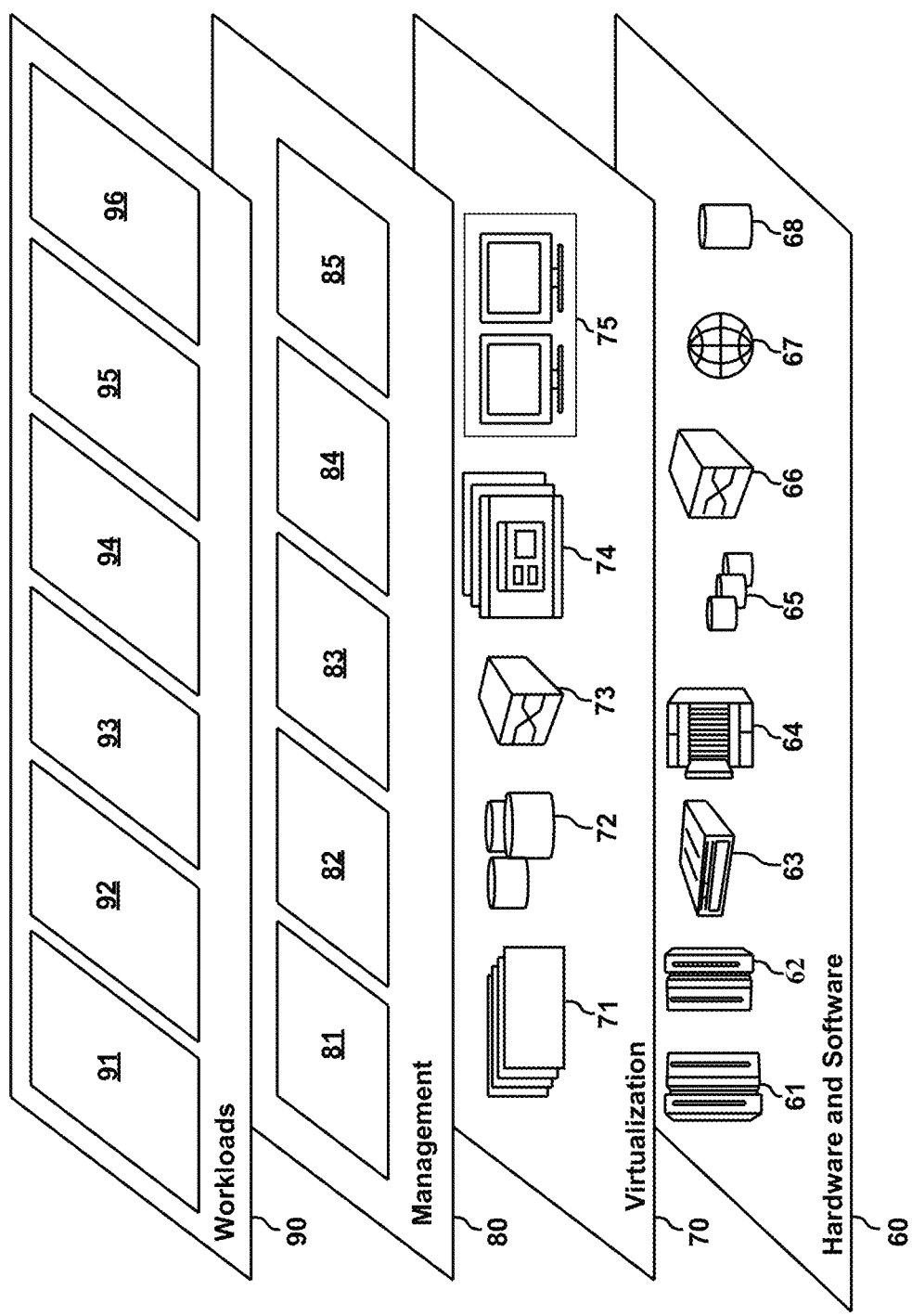
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a tire imbalance prediction system (TIPS) 96.

Conventionally, a visual inspection (typically by an expert) is used to determine whether wheels need to be aligned and/or tires replaced. The process of wheel alignment degradation can happen gradually over time, due to parts gradually wearing out over time, which can make it difficult to detect with just a visual inspection. On the other hand, the wheel misalignment can occur rapidly when a vehicle rolls over a large pothole. Similarly, tire imbalance can occur slowly over time as the tread on the tires wears out, or rapidly if a wheel weight falls off one or more wheels. One or more embodiments advantageously provide an intelligent system that can identify symptoms and causes, e.g., vibrations from the steering wheel (wheel balance issue), asymmetric tire wear (alignment issue), car pulling to one side (alignment issue/under pressure), or center/cup wear (over pressure/under pressure).

Aspects of the invention may improve safety and driving comfort, enhance the life and performance of tires, and improve the overall health of a vehicle by providing early detection or prediction of tire imbalance or wheel misalignment of one or more tires or wheels of a vehicle. Some aspects the invention include sensing one or more symptoms (e.g., frequency and magnitude of vibration) that could indicate a tire imbalance and/or misalignment of wheels, determining current and predicted conditions of the tires based on a plurality of factors (vehicle condition, road condition, driving behavior, age of tires and vehicle, etc.), predicting risk R of the one or more tires becoming imbalanced or wheels misaligned (with risk vector), and then, notifying the driver of the vehicle to prevent the occurrence of the risks.

Embodiments of the invention are especially useful for self-driving cars as there may not be a human driver to assess changes in the steering, vehicle drift, etc. over time, and it might be likely, at least in the case of self-driving taxis, that a passenger will not travel multiple times in the same car so that detecting a change in time in the way a vehicle feels may not be possible.

Figure 3:
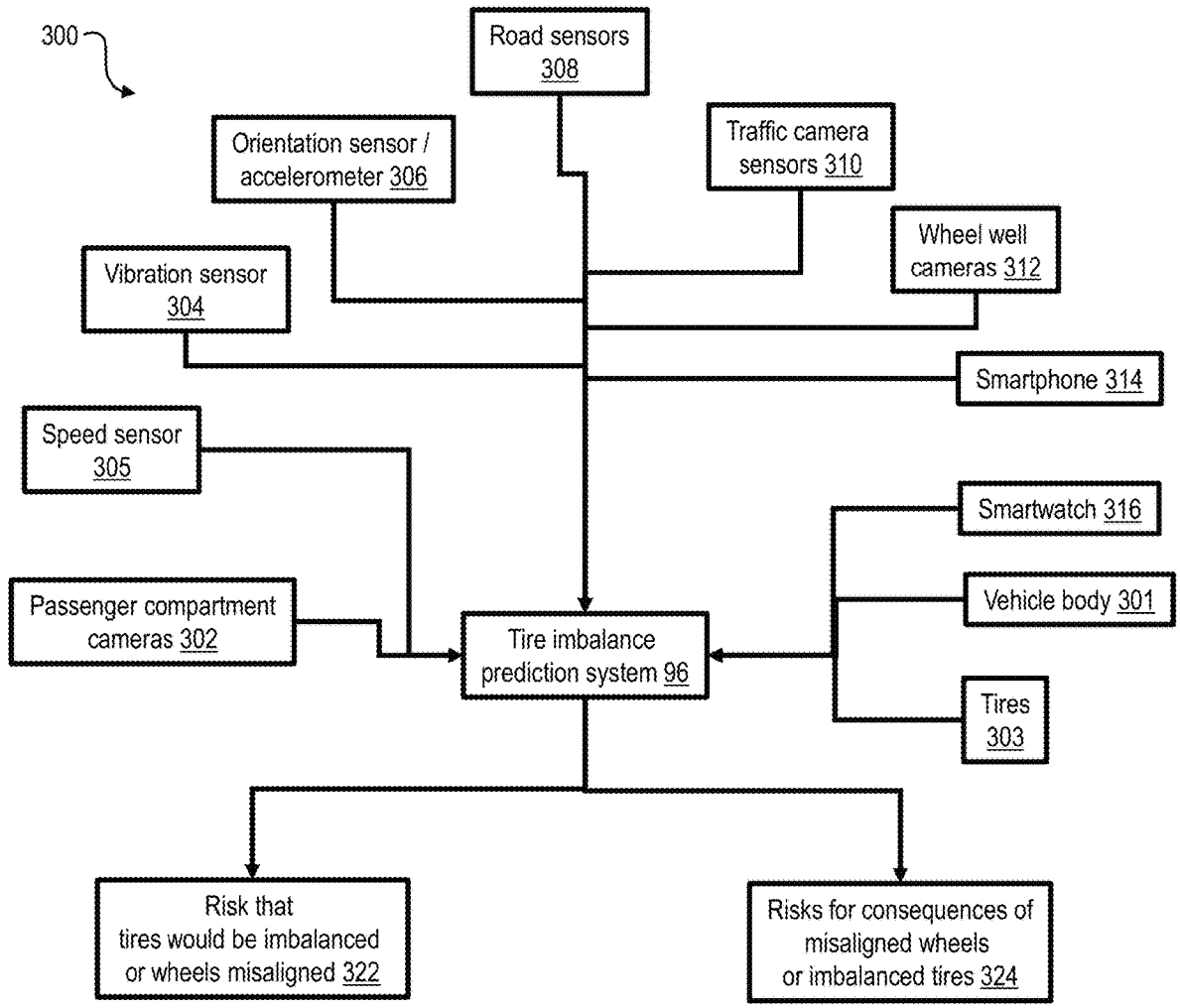
FIG. 3 depicts in a schematic hardware that is associated with a tire imbalance prediction system according to an exemplary embodiment.

FIG. 3 depicts in a schematic hardware 300 that is associated with an AI system (the tire imbalance prediction system (TIPS) 96) (which may be implemented completely or partially in the cloud, or not in a cloud environment). In one or more embodiments, the TIPS 96 uses data from sensors (passenger compartment cameras 302, vibration sensor 304 (e.g., a wheel-mounted vibration sensor), orientation sensor 306, road sensors 308, traffic camera sensors 310, wheel well cameras 312, accelerometers or other sensors in (smart)phones 314, etc.) to identify one or more conditions that may make a tire to be unbalanced or wheels misaligned, and to compute as output a risk vector R that includes a risk 322 that the monitored tires would be imbalanced and/or wheels misaligned, as well as consequential risks 324 for some potential consequences of the tire imbalance and/or wheel misalignment. Potential consequences may include driver/passenger discomfort from excessive wheel vibration, uneven tread wear, premature tire wear, long-term damage to the overall health of a vehicle, increased fuel costs, and steering bias that may cause a drift the vehicle to the side of a road. Identifying the conditions and computing the risk vector can be done by using data from sensors, one or more cameras, accident logs, etc. Such data is used by feeding it into a neural network that is integral to the TIPS 96. The neural network learns from the data what is typical for a similar vehicle moving at a given speed (i.e., with proper alignment and in-spec tires), and thereby learns to distinguish abnormal data that implies a tire imbalance or wheel misalignment.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

In one or more embodiments, the TIPS 96 receives vibration data from the vibration sensor 304 or from the smartphone 314 at different velocities of the vehicle inside the car. For example, the smartphone 314 is placed on a cradle in the vehicle and it records the vibration over a period of time. In one or more embodiments, the TIPS 96 receives steering wheel vibration information from a smartwatch 316 that is worn on the wrist of a driver. By correlating the vibration data to speed data from the orientation sensor 306 or from the smartphone 314 (speed data can be derived from acceleration/location data), the TIPS 96 learns normal vibration patterns and then can identify abnormal vibrations that imply a tire imbalance or wheel misalignment.

In one or more embodiments, the TIPS 96 receives either individual images or video frames of tire treads from the wheel well cameras 312 periodically when the vehicle is stationary. In one or more embodiments, a user simply may take pictures (or short video) of the tires from different directions using a visual analytics-based mobile app in the smartphone 314; the app uploads those images to the TIPS 96. The TIPS 96 then uses custom trained computer vision models (running on cloud, e.g.) that automatically generate estimated scores for tire imbalance $S_{im}$ and wheel misalignment $S_{mis}$ by analyzing the pictures/video for each tire of the vehicle V.

In one or more embodiments, the TIPS 96 receives image information from cameras outside the vehicle and from cameras inside the vehicle. The TIPS 96 uses a neural network to analyze the images. The external images are analyzed for road conditions and for speed (based on blurring/relative motion of objects in the field of view) while the internal images are analyzed for steering wheel motion/vibrations. The image analysis is used to identify vibrations, as they are evident when one or more wheels are out of balance (e.g., a wheel weight is missing), by comparison to normal values learned by the neural network during normal operation of the vehicle.

In one or more embodiments, the TIPS 96 leverages data from a lane departure/lane centering software module of the vehicle to detect a tendency of the vehicle to drift one side or the other and thereby detects a possibility of wheel misalignment or tire imbalance.

In one or more embodiments, if a degree of risk (computed as a function of estimated imbalance $S_{im}$ and misalignment $S_{mis}$ scores) is above a minimum threshold value T, the tire imbalance prediction system (TIPS) 96 automatically suggests tire or vehicle maintenance. In one or more embodiments, the TIPS 96 automatically schedules the tire or vehicle maintenance, i.e. auto-scheduling tire or vehicle maintenance service at location L and time-of-day ToD so that the user doesn't have to wait in line. Note that, in one or more embodiments, the user specifies the minimum threshold value T at the start and over time the TIPS 96 learns to determine T and adjust appropriately. In another embodiment the TIPS 96 may perform a calculation of the cost of risks entailed by not servicing the tires or vehicle vs. the cost of having the tires or vehicle repaired regularly. This includes the TIPS 96 recommending periodic tire or vehicle checkup. Again, the system's objective is to minimize risk, and therefore the decision to repair the tires or vehicle (regularly balancing the tires, aligning the wheels, etc.) will be based on: 1) the likelihood of predicted wheel misalignment, 2) the likelihood of the predicted tire imbalance, 3) the estimated potential consequences in anticipated directions of road/travel (due to the predicted drift analysis of road condition, analysis of roadside events, etc.) 4) the estimated likelihood of one or more tires blowing out and consequences due to worn out treads.

In one or more embodiments, some or all of the sensors 302, 304, 306, 308, 310, 312, 314 can report the effect of the vehicle running over a pothole and alert other connected vehicles of the likelihood of tire/vehicle damage, wheel misalignment, and/or tire imbalance as a result of hitting the pothole at a certain speed. Additionally, in one or more embodiments, the TIPS 96 can engage a driving prevention module to safely interrupt operation of the vehicle (e.g., turning off the engine when the vehicle is stopped) when tires' risk is deemed dangerous for driving the vehicle on specific roads.

In one or more embodiments, the TIPS 96 calculates a vehicle health index that is based on detected/predicted imbalance or misalignment of tires. The vehicle health index is calculated using the data collected from various sensors (e.g., in-vehicle sensors such as acceleration and steering wheel cameras, external sensors such as road cameras), coupled with data from vehicle subsystems such as fuel system, ignition system, exhaust system, and cooling system. The data is transmitted to the cloud/server which analyzes the data based on the embodiments described, likelihood of the tire misalignment, likelihood of the predicted imbalance, and the like. Patterns that may lead to imbalance or misalignment of tires are learned using machine learning algorithms such as classifiers, Decision Tree, Support Vector Machine, Nearest Neighbor, and Random Forest, etc. In one or more embodiments, the TIPS 96 calculates a driver/passenger discomfort score that is based on detected/predicted imbalance or misalignment of tires. The discomfort score is calculated using data collected from various in-vehicle sensors (e.g., vibration sensors, cameras), coupled with data from wearables devices from the driver (e.g., smartwatch) that can estimate "cognitive" state (such as stress, torque or force added to the wrist) due to imbalance or misalignment of tires. When the "cognitive" state added to the steering wheel surpasses an estimated threshold (with methods such as logistic regression) for that driver (based on historical data from driver, weather, and the road chosen) an alarm is raised.

A (dis)comfort score can be calculated from the log regression given the pattern of the driver. In one embodiment, a regression model can be trained to predict the current (dis)comfort score and compare if the predicted score is above a given (dis)comfort threshold level.

Figure 4:
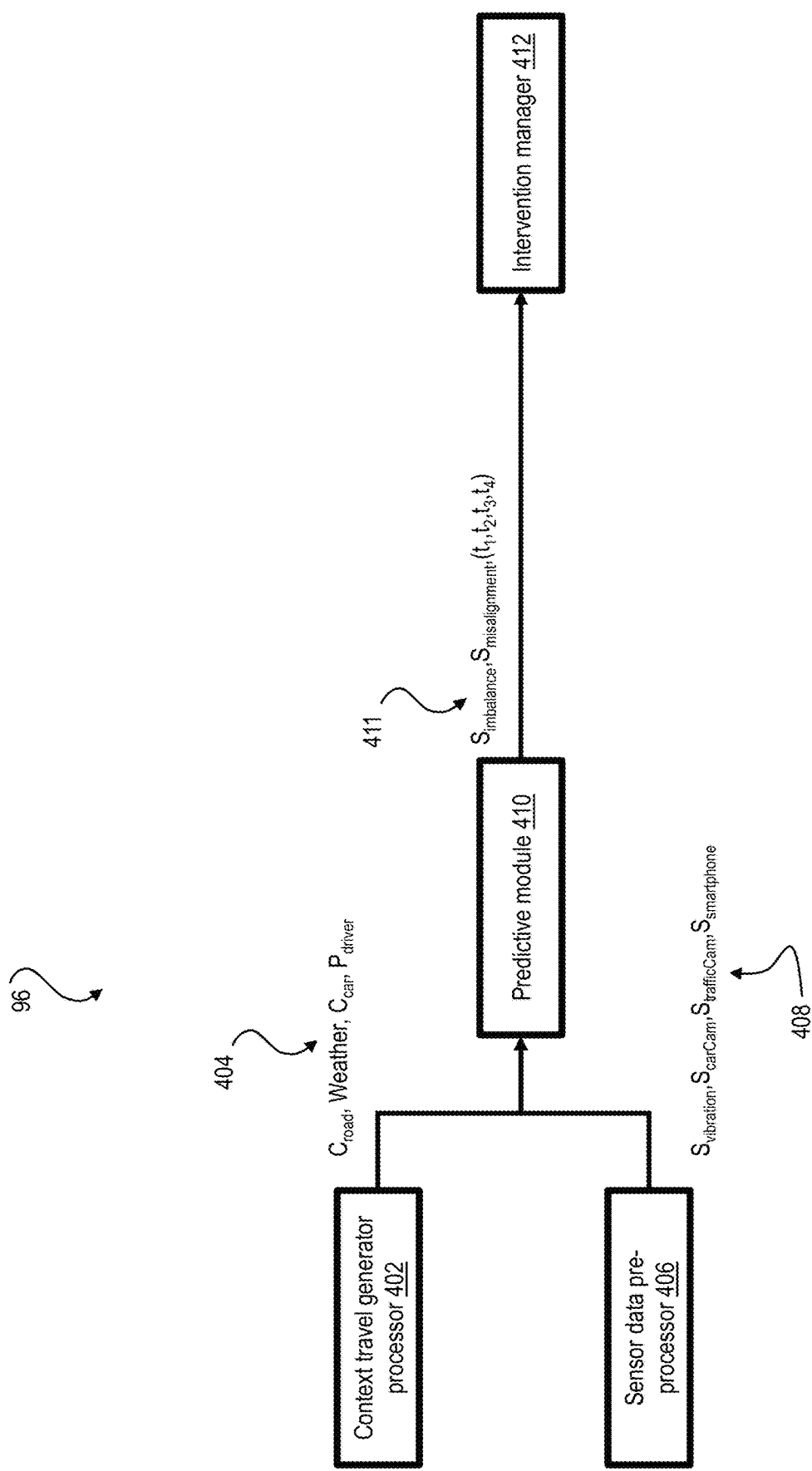
FIG. 4 depicts in a schematic an exemplary time series analysis of the tire imbalance predicting system according to an exemplary embodiment.

FIG. 4 depicts in a schematic an exemplary time series analysis of the tire imbalance predicting system (TIPS) 96. In one or more embodiments, the TIPS 96 includes a context travel generator module 402 that generates a context tuple 404 for future travel. In one or more embodiments, the context tuple 404 includes a state of the road for that trip, the weather forecast for the particular date, the overall status of the vehicle and the profile of the driver for those type of trips (i.e. $C_{road}$, Weather, $C_{car}$, $P_{driver}$).

In one or more embodiments, the TIPS 96 also includes a sensor data pre-processor module 406 that collects data in real time during a trip, such as vibration information of the steering wheel (obtained from a smartwatch or fitness tracker attached to the driver's wrist), video frames from vehicle mounted cameras and in-place (traffic) cameras, smartphone sensors (gyroscope, GPS, etc.). The data tuple includes ($S_{vibration}$, $S_{carCam}$, $S_{trafficCam}$, $S_{smartphone}$). After collection the pre-processor module 406 produces a normalized vector 408 and passes the normalized vector over to a predictive module 410. The predictive module 410 is in charge of creating embeddings by integrating (merge into one vector per sample), encoding (e.g. Ordinal Encoding, One Hot Encoding, etc.) and mapping the variables extracted from 402 and 406 before giving these samples to the model for training. The predictive module 410 creates an embedding input with both output modules (the context travel generator 402 and the sensor data pre-processor 406). The predictive model inside the module returns as outputs: a probability score for misalignment and another probability score for imbalance, and a characterization of the state of each tire (t_i) to predict the onset of wheel misalignment or tire imbalance as well as an estimate of time to failure (when the tires will blow out).

Thus, as output, the predictive module 410 provides a tuple 411 ($S_{imbalance}$, $S_{misalignment}$, ($t_1$, $t_2$, $t_3$, $t_4$)) that includes a probability score for future wheel misalignment or tire unbalanced state and a characterization of the current state of each tire. With these elements an intervention manager 412 can create a set of actions regarding the safety of the driver and the vehicle (send message to the driver with a warning of the state of the car, request an automatic appointment with a mechanic at the destination city, etc.).

In the context of this disclosure, various modules (e.g., the context travel generator module 402, the sensor data pre-processor module 406, and the predictive module 410) implement unsupervised machine learning, trained by data from "baseline" vehicles, to generate "normal" conditions for vibration and speed and then to detect abnormal conditions (i.e., tire/wheel misalignment and/or tire imbalance) by comparing real-time data from a test vehicle to the normal conditions produced by unsupervised machine learning. The intervention manager 412 implements a process informed by supervised machine learning model, i.e. records of human-mediated actions taken in response to previous abnormal conditions, in order to automatically generate action(s) in response to one or more novel abnormal conditions.

Figure 5:
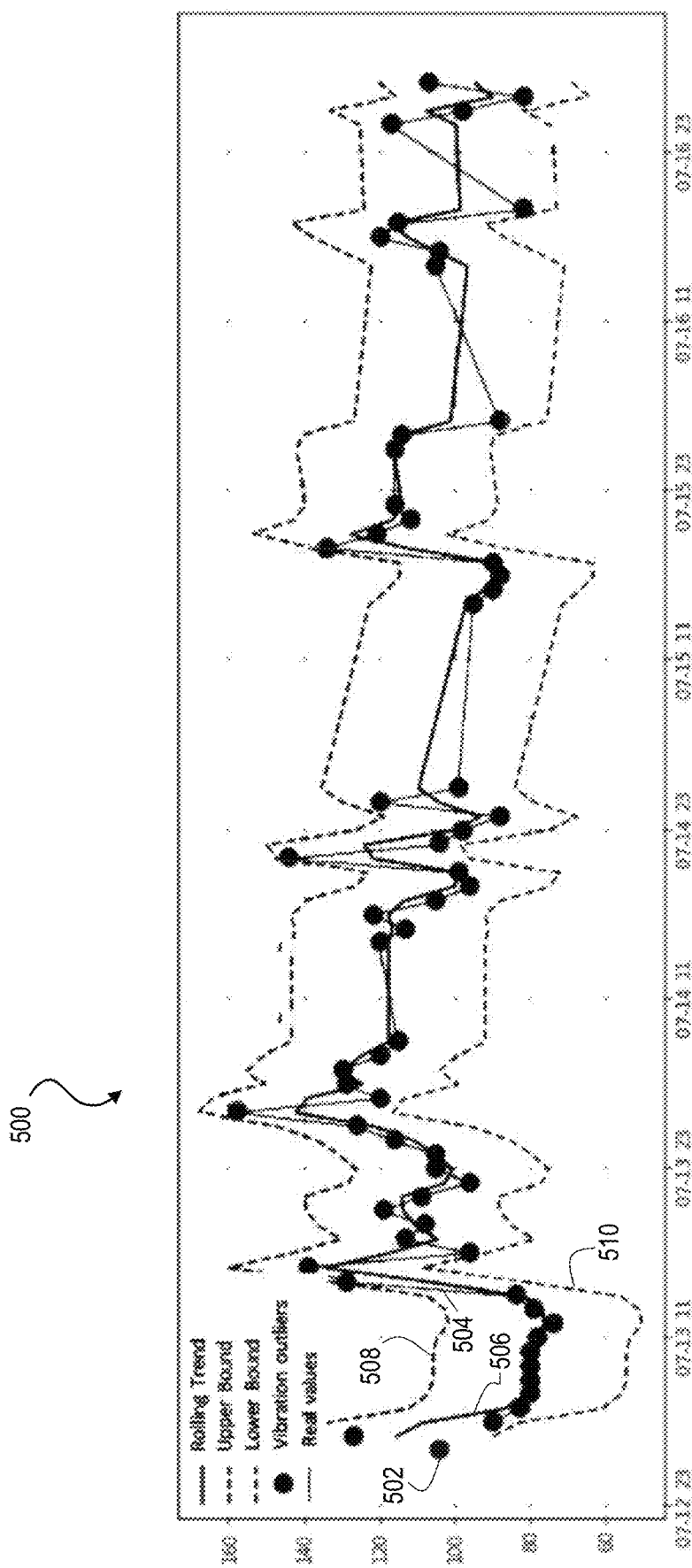
FIG. 5 depicts a time plot of wheel vibration data that is used by the tire imbalance predicting system according to an exemplary embodiment.

FIG. 5 depicts a schematic time plot of wheel vibration data 500 that is used by the tire imbalance predicting system TIPS 96. The abscissa plots time by days and hours. The ordinate plots vibration amplitude in units of acceleration of gravity, "G." Additionally or alternatively, the frequency of vibrations could be measured in units of Hertz (Hz). The data 500 includes vibration "outliers" 502 that mark real measured data points obtained while a vehicle is in motion; a curve 504 connects the data points 502 (alternatively, simply draw a line (best fit) through the data points, to represent an average vibration). The data 500 also includes a rolling trend (running average) curve 506 (which does not connect the data points, but tracks their historical average), along with an upper bound 508 and a lower bound 510 based on the rolling trend curve 506. The data points 502 correspond to different vehicle speeds at different times of day. The TIPS 96 uses the vibration data 500 to detect and predict imbalance/wheel misalignment by estimating upper and lower bounds of common/expected vibrations, then classifying everything outside those bounds as a potential misalignment or imbalance issue.

Figure 6:
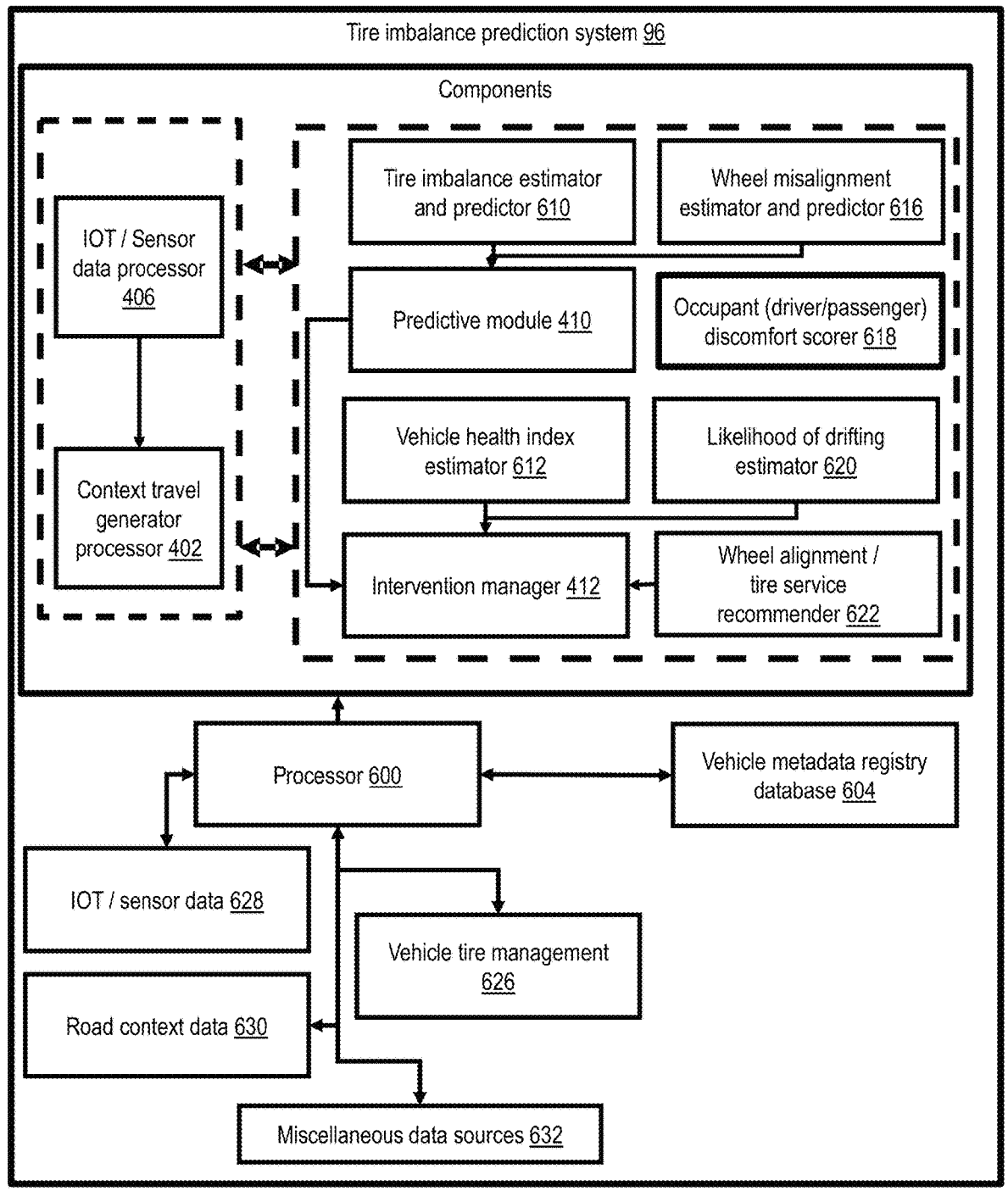
FIG. 6 depicts, in a schematic, components of the tire imbalance predicting system according to an exemplary embodiment.

FIG. 6 depicts, in a schematic, components of the tire imbalance predicting system 96. The TIPS 96 includes a processor 600, which implements an internet-of-things (IOT) sensor data processor 406, a road conditions analyzer (context travel generator processor) 402, and the predictive module 410. The road conditions analyzer 402 uses image data from wheel well cameras and exterior cameras (collectively, a portion of the "TOT/sensor data" 628), in order to identify road conditions that might contribute to wheel vibration data.

The processor 600 produces vehicle metadata 624 from vehicle tire management data 626, IOT/sensor data 628, road context data 630, and other miscellaneous data sources 632. The vehicle metadata 624 includes outputs from a tire imbalance estimator and predictor 610, a vehicle health index estimator 612, an intervention manager 412, a wheel misalignment estimator and predictor 616, an occupant (driver/passenger) discomfort scorer 618, a likelihood of drifting estimator 620, and a wheel alignment/tire service recommender 622. The vehicle metadata 624 includes an estimate and prediction of wheel imbalance, an estimate of vehicle health, a recommended intervention (to include tire service scheduling), an estimate and prediction of wheel misalignment, a score for driver/passenger discomfort, and an estimated likelihood of lane drifting.

FIG. 4 shows a subset of interactions between modules from FIG. 6 for a given task. The context travel generator processor 402 takes as inputs the sensors 406 to aggregate and provides information regarding the state of the road for that trip, the weather forecast for the particular date, the overall status of the vehicle, and the driver's profile for those types of trips.

Multiple components use output from 402. For example, the vehicle health index estimator 612 calculates the vehicle's overall status for a given trip. Similarly, the drifting estimator 610, imbalance and misalignment estimator, uses the output from 402 and real-time data sensors from 406 to create scores of the current condition of tires.

The predictive module 410 assembles information from the tire imbalance predictor 610 and the tire misalignment predictor 616 to return probability scores for both factors and characterization of each tire's state. The output is taken by the intervention manager 412 and the tire service recommender 622 to define the next course of action via a rule-based or reinforcement learning based system. Finally, the occupant discomfort scorer 618 computes the discomfort caused by misalignment, and the like, as discussed above.

Figure 7:
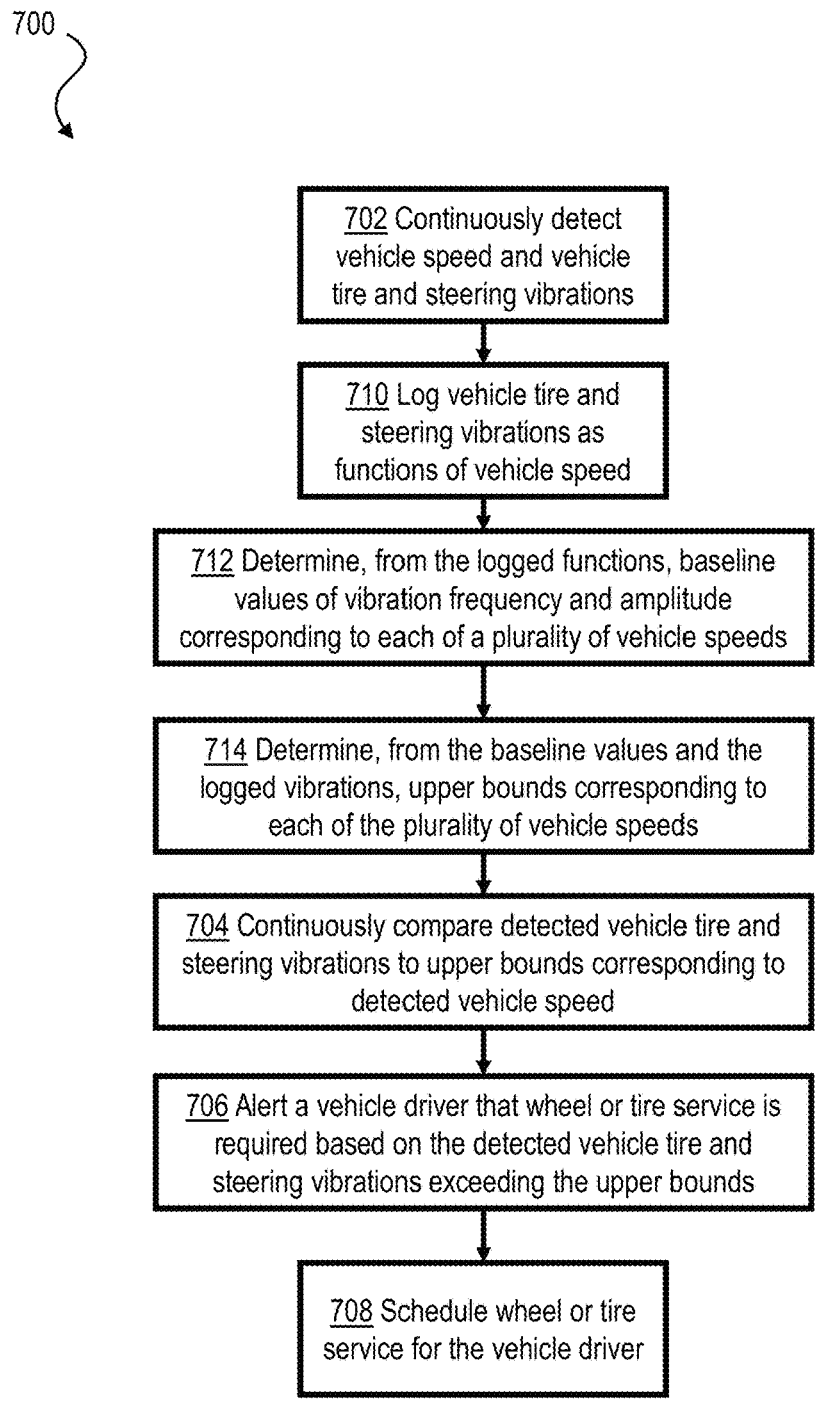
FIG. 7 depicts, in a flowchart, steps of a method for detecting wheel misalignment and/or tire imbalance according to an exemplary embodiment.

Given the discussion thus far, and with reference to the accompanying drawings, it will be appreciated that, in general terms, an exemplary method 700, according to an aspect of the invention and as shown in FIG. 7, includes at 702 vehicle-mounted sensors continuously detecting vehicle speed and vehicle tire and steering vibrations; at 704 a processor implementing a machine-learning program that continuously monitors signals from the vehicle-mounted sensors and compares detected vehicle tire and steering vibrations to upper bounds corresponding to detected vehicle speed; and at 706 the processor alerting a vehicle driver that wheel or tire service is required based on the detected vehicle tire and steering vibrations exceeding the upper bounds.

In one or more embodiments, the method also includes at 708 the processor scheduling wheel or tire service for the vehicle driver.

In one or more embodiments, the method also includes at 710 the processor logging vehicle tire and steering vibration as functions of vehicle speed; at 712 the processor determining, from the logged functions, baseline values of vibration frequency and amplitude corresponding to each of a plurality of vehicle speeds; and at 714 the processor determining, from the baseline values and the logged vibrations, upper bounds corresponding to each of the plurality of vehicle speeds.

For example, in one or more embodiments the method includes at 710 the processor logging steering vibration from a smartwatch 316 worn by the vehicle driver. As another example, in one or more embodiments the method includes at 710 the processor logging vehicle tire vibration from a wheel-mounted vibration sensor 304. In one or more embodiments, the method includes at 702 the processor logging vehicle speed based on images from a wheel-well mounted camera 312. In one or more embodiments, the method includes at 702 the processor logging vehicle speed based on data from an accelerometer 306 within the vehicle.

According to another aspect, an exemplary apparatus includes a vehicle body 301; tires 303 mounted to the vehicle body; a speed sensor 305 mounted to the vehicle body; a vibration sensor 304 mounted to the vehicle body; and a processor 600 connected in communication with the speed sensor and the vibration sensor (or wirelessly accessible therefrom). The processor is adapted to implement any of the method steps above.

In one or more embodiments, the vibration sensor is in a smartwatch 316 worn by the vehicle driver and measures steering vibration. In one or more embodiments, the vibration sensor is a wheel-mounted vibration sensor 304 and measures tire vibration. In one or more embodiments, the speed sensor includes a wheel-well mounted camera 312. In one or more embodiments, the speed sensor includes an accelerometer 306 within the vehicle.

According to another aspect, a computer readable storage medium embodies computer executable instructions which that when executed by a computer cause the computer to facilitate any of the method steps above.

Figure 8:
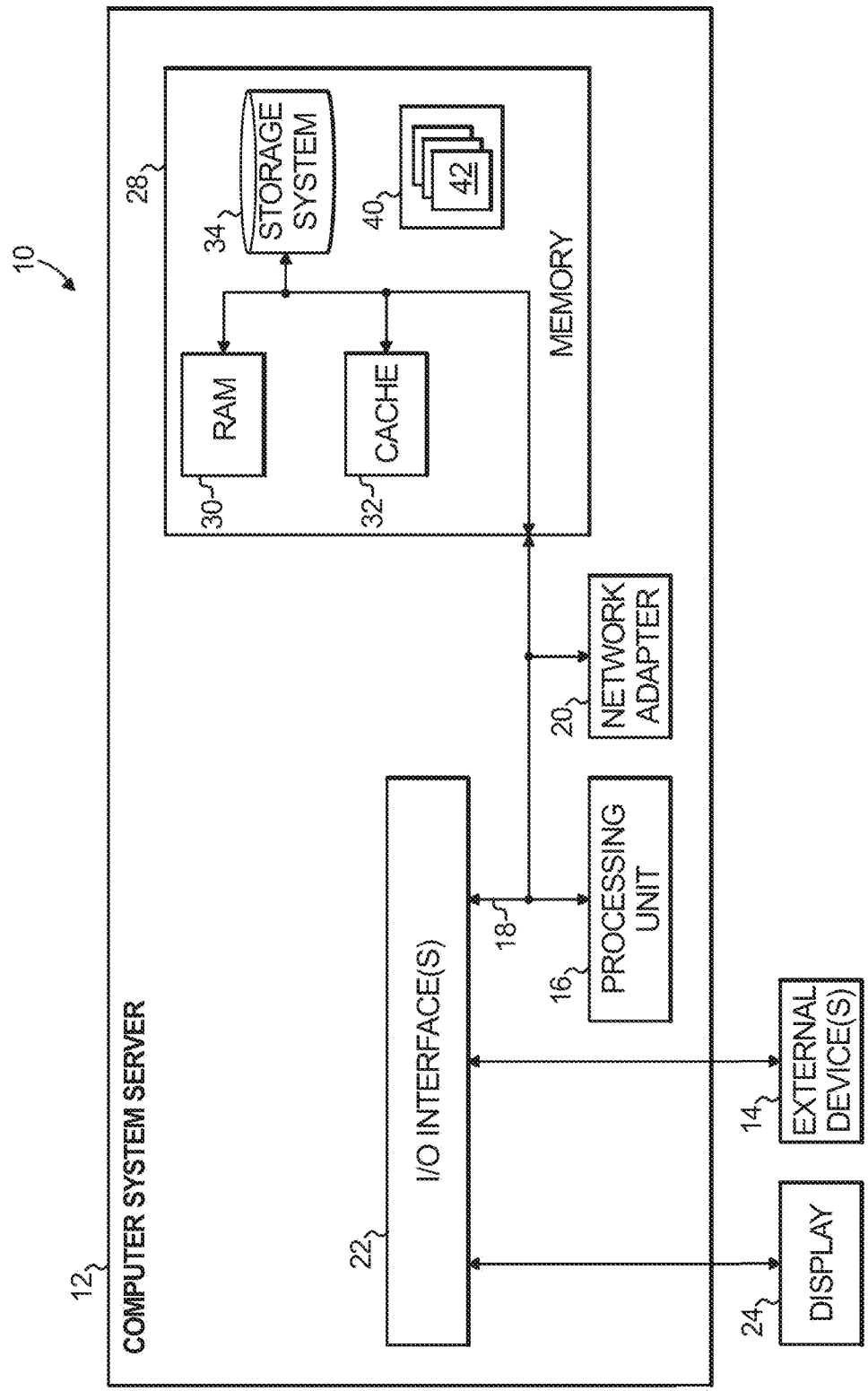
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    vehicle-mounted sensors continuously detecting vehicle speed and vehicle tire and steering vibrations;
    a processor implementing a machine-learning program that continuously monitors signals from the vehicle-mounted sensors and compares detected vehicle tire and steering vibrations to upper bounds corresponding to detected vehicle speed; and
    the processor alerting a vehicle driver that wheel or tire service is required based on the detected vehicle tire and steering vibrations exceeding the upper bounds.

2. The method of claim 1, further comprising:
    the processor scheduling wheel or tire service for the vehicle driver.

3. The method of claim 1, further comprising:
    the processor logging vehicle tire and steering vibration as functions of vehicle speed;
    the processor determining, from the logged functions, baseline values of vibration frequency and amplitude corresponding to each of a plurality of vehicle speeds; and
    the processor determining, from the baseline values and the logged vibrations, upper bounds corresponding to each of the plurality of vehicle speeds.

4. The method of claim 3, further comprising: the processor logging steering vibration from a smartwatch worn by the vehicle driver.

5. The method of claim 3, further comprising: the processor logging vehicle tire vibration from a wheel-mounted vibration sensor.

6. The method of claim 3, further comprising: the processor logging vehicle speed based on images from a wheel-well mounted camera.

7. The method of claim 3, further comprising: the processor logging vehicle speed based on data from an accelerometer within the vehicle.

8. An apparatus comprising:
    a vehicle;
    tires mounted to the vehicle;
    a speed sensor mounted to the vehicle;
    a vibration sensor mounted to the vehicle body; and
    a processor connected in communication with the speed sensor and the vibration sensor, wherein the processor is adapted to:

continuously detect vehicle speed and vehicle tire and steering vibrations by monitoring signals from the speed sensor and the vibration sensor;

continuously compare detected vehicle tire and steering vibrations to upper bounds corresponding to detected vehicle speed; and alert a vehicle driver that wheel or tire service is required based on the detected vehicle tire and steering vibrations exceeding the upper bounds.

9. The apparatus of claim 8, wherein the processor is further adapted to:

schedule wheel or tire service for the vehicle driver.

10. The apparatus of claim 8, wherein the processor is further adapted to:

log vehicle tire and steering vibration as functions of vehicle speed;

determine, from the logged functions, baseline values of vibration frequency and amplitude corresponding to each of a plurality of vehicle speeds; and determine, from the baseline values and the logged vibrations, upper bounds corresponding to each of the plurality of vehicle speeds.

11. The apparatus of claim 8, wherein the vibration sensor comprises a smartwatch worn by the vehicle driver and measures steering vibration.

12. The apparatus of claim 8, wherein the vibration sensor comprises a wheel-mounted vibration sensor and measures tire vibration.

13. The apparatus of claim 8, wherein the speed sensor comprises a wheel-well mounted camera.

14. The apparatus of claim 13, wherein the speed sensor comprises an accelerometer within the vehicle.

15. A computer readable storage medium embodying computer executable instructions that when executed by a computer cause the computer to facilitate the method of:

continuously detecting vehicle speed and vehicle tire and steering vibrations;

continuously comparing detected vehicle tire and steering vibrations to upper bounds corresponding to detected vehicle speed; and alerting a vehicle driver that wheel or tire service is required based on the detected vehicle tire and steering vibrations exceeding the upper bounds.

16. The medium of claim 15, the method further comprising:

scheduling wheel or tire service for the vehicle driver.

17. The medium of claim 15, the method further comprising:

logging vehicle tire and steering vibration as functions of vehicle speed;

determining, from the logged functions, baseline values of vibration frequency and amplitude corresponding to each of a plurality of vehicle speeds; and determining, from the baseline values and the logged vibrations, upper bounds corresponding to each of the plurality of vehicle speeds.

18. The medium of claim 17, the method further comprising: logging steering vibration from a smartwatch worn by the vehicle driver.

19. The medium of claim 17, the method further comprising: logging vehicle tire vibration from a wheel-mounted vibration sensor.

20. The medium of claim 17, the method further comprising: logging vehicle speed based on images from a wheel-well mounted camera.

\* \* \* \* \*